United States Patent

[11] 3,599,165

[72] Inventors George Wendell;
Le Roy J. Kniskern; Walter F. O'Brien, Jr.,
all of Blacksburg, Va.
[21] Appl. No. 15,712
[22] Filed Mar. 2, 1970
[45] Patented Aug. 10, 1971
[73] Assignee Litton Precision Products, Inc.
Blacksburg, Va.

[54] ROTARY CONDUCTOR
14 Claims, 11 Drawing Figs.
[52] U.S. Cl. ...................................................... 339/5,
191/12
[51] Int. Cl. ................................................ H01r 39/00
[50] Field of Search ........................................ 339/5, 8, 6,
9, 17 F; 191/12, 12.2

[56] References Cited
UNITED STATES PATENTS
3,061,234 10/1962 Morey ........................... 191/12.2 X

| 3,251,955 | 5/1966 | Erickson | 191/12 |
| 3,430,179 | 2/1969 | Shoji | 339/5 |

*Primary Examiner*—Richard E. Moore
*Attorneys*—Alfred B. Levine and Alan C. Rose ABSTRACT: An electrical coupling device providing a series of continuous, unbroken, unsliding electrical connections between two relatively rotatable members over a limited angular displacement. The coupler is provided with two coaxially related members that are rotatably interconnected for angular displacement, and between the members is provided in axially spaced array a series of isolated flexible electrical conductors that are coiled and uncoiled between the said members with rotative displacement between the members.

PATENTED AUG 10 1971    3,599,165

INVENTORS
GEORGE WENDELL
LEROY J. KNISKERN
WALTER F. O'BRIEN, JR.

BY *Alfred B. Levine*

ATTORNEY

INVENTORS
GEORGE WENDELL
LEROY J. KNISKERN
WALTER F. O'BRIEN, JR.

BY *Alfred B. Levine*

ATTORNEY

3,599,165

ROTARY CONDUCTOR

FIELD OF INVENTION

This invention relates to improvements in rotary electrical conductors and is more particularly directed to multiple circuit rotary electrical couplings for providing a large number of continuous electrical connections over a limited rotary displacement that may involve up to one or more revolutions.

BACKGROUND OF THE INVENTION

Transmission of electrical signals and power between relatively rotatable members has been most commonly provided by slip rings and brushes that are subject to wear and need replacement, as well as being undesirable in producing electrical "noise" resulting from the sliding interconnection. This electrical "noise" results from intermittent loss of electrical contact between the members and this "noise" condition generally worsens with wear of the brushes and with the slip rings.

Continuous electrical connections between members of limited rotation has also been provided in the past by joining the members with leads or conductors that may twist or bend as the members are relatively rotated to provide continuous, unbroken connections between the parts.

SUMMARY OF THE INVENTION

The present invention provides a multicircuit rotary electrical coupler of the latter type providing a plurality of unbroken circuit connections between two relatively rotatable members over limited angular displacement that may involve any fraction or multiple of a complete revolution. This coupler is provided in a miniature unit of very small size yet is capable of supplying a comparatively large number of separate circuit connections over a relatively large angle of rotation between the members, and requiring but a very small torque for rotatable displacement. Additionally, the coupler provides an improved manner of insulating the multiple electrical circuits from each other, and protecting and isolating the circuits from one another and from external movable parts to protect the conductors from breakage or injury. Additionally, the conductors are arranged in such manner as to be capable of a relatively large life cycle of operation involving a comparatively large number of cycles of operation without breakage or fatigue.

DETAILED DESCRIPTION OF THE PREFERRED EMBODIMENTS

Figure 1:
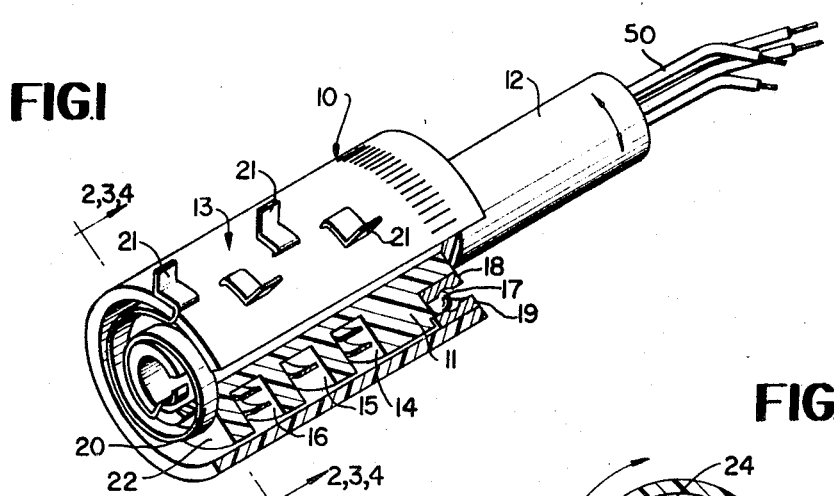
FIG. 1 is a perspective view, partly in section, illustrating a multicircuit rotary coupler according to the present invention.

As illustrated in FIG. 1, one rotary electrical coupler 10 comprises an inner generally hollow tubular member or drum 11 disposed coaxially inside of a hollow outer tube 13 and rotatably interconnected thereto by a series of space antifriction bearings, such as shown at one end by a ball bearing construction having an inner bearing race 18 on the inner drum 11, an outer bearing race 19 on the inside of the outer tube 13, and ball bearings 17.

The inner drum 11 is provided with a hollow extended portion 12 for receiving at the inlet a series of insulated electrical conductor wires 50 that pass through the hollow core of extension 12 and into the hollow interior of drum 11.

The drum 11 is formed with a series of radially arranged circumferential slots 14, 15 and 16 disposed along its length and with a different slot being provided corresponding to each different one of the inlet conductor leads 50. Each such slot accommodates a spirally wound flat strip of metal conductor 20 that generally resembles a spirally wound spring, as best viewed in FIGS. 2, 3 and 4. The inner end 25 of each such spiral conductor strip 20 is fastened to the inner drum 11 and passes through a slot 24 (FIG. 2) provided in the drum 11 and leading to the interior of the drum 11. Inside of the drum 11, this end 25 of each of the wire strips 20 is adapted to be electrically connected to a different one of the inlet conductor leads 50.

The outer end 21 of each such spiral conductor strip 20 is fastened at the outside of outer tube 13 and passes through a slot formed through the tube 13 to provide a series of spaced electrical contacts 21 outside of the coupler as best shown in FIG. 1.

In a preferred construction, there is provided an even number of spirally wound conductors 20 with alternate ones being wound in clockwise and counterclockwise directions to balance out the spring torques and therefore minimize the turning torque. Other windings may be employed so long as the total number of strips wound clockwise equals the total number counterclockwise.

Thus, each one of the inlet electrical wire leads 50 passing into the interior of extension 12 of the drum 11 is connected to the inside contact 25 of a different one of the spirally wound strips 20, and electrical conduction is made through that spirally wound strip 20 to a separate electrical contact 21 connected to and accessible from the outside of the outer tube 13.

Figure 3:
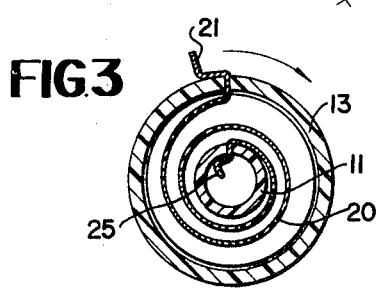
FIGS. 2, 3 and 4 are sectional views taken through the same cross section of FIG. 1 and illustrating the coiling of the internal electrical conductor for different angular displacements.
Figure 2:
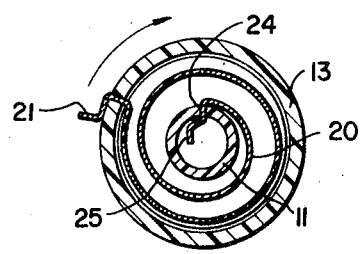
Figure 4:
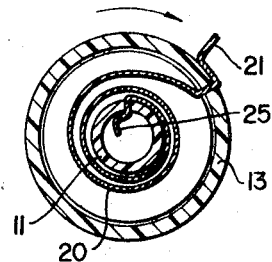

From the above description, the mode of operation of this rotary coupler in providing continuous electrical connection for each lead during rotation of the member 12 or 11 is believed evident as illustrated in FIG. 2, 3 and 4. As shown, clockwise rotation of the outer tube 13 about the inner drum 11 serves to progressively wind the coils of each one of the clockwise strip conductors 20 more tightly together so that following one or more revolutions of the outer tube 13, the coils of such conductors 20 progressively close together to a tightly wound position as best shown in FIG. 4. Concurrently, those strips wound counterclockwise are unwound. Since each strip coil 20 is accommodated within its own radial slot provided in drum 11, each of these spiral strip conductors is very effectively insulated from the other conductors and a comparatively large number of separate rotatable electrical connections may be provided within a small miniaturized rotary coupler unit.

The spiral strip connectors 20 are preferably made of thin material having a relatively low spring constant yet capable of cyclic operations for a sufficiently large number of rotative displacements as desired without excessive fatigue and rupture. This permits the unit to be rotated with but a small drive torque so as to impose only a small load upon any rotary drive element. Furthermore, the alternate clockwise and counterclockwise windings of the strips 20 reduces or balances the torque.

It will be noted that each coil or spiral winding 20 is completely enclosed inside of the rotary unit except for its outer contact 21 and its inner contact 25. Each inside coil is also completely protected and insulated from the others inside of the unit by the sidewalls of its slot formed in the inner drum 11. This arrangement therefore provides the desired compactness, insulation, and protection of the leads, strips and conductors from shock, acceleration and physical contact with other moving parts as might be desired or required for many industrial applications.

FIGS. 5 to 9, inclusive, illustrate a preferred multiple conductor construction for providing a larger number of conductors in a small volume rotary device that is also comparatively inexpensive to construct.

In this embodiment, the coiled strip conductors are not individual conductors 20, as in FIGS. 1 to 3, above, but instead are provided in the form of a flexible flat insulator tape 30 and 31, each supporting a series of parallel-arranged thin electrical conductor strips 33, 34, 35 and 36 that are embedded into or printed on the flexible insulator tape 30 and 31.

Figure 5:
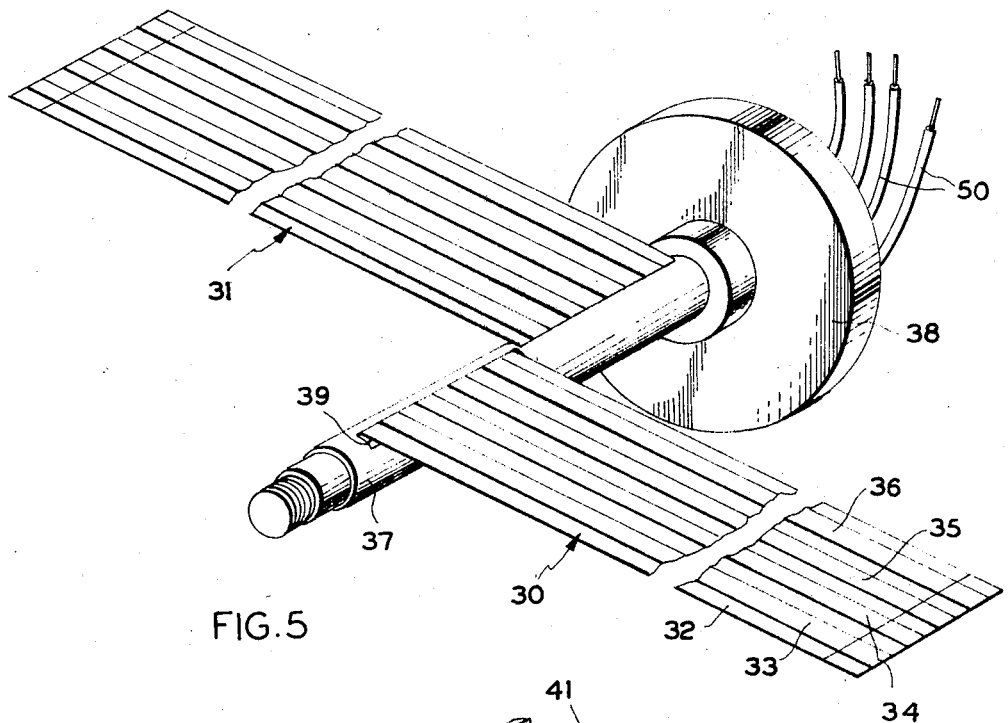
FIGS. 5 to 9, inclusive, are perspective views sequentially illustrating the construction and assembly of a preferred multicircuit rotary coupling according to the invention; and, FIGS. 10 and 11 are cross-sectional schematic illustrations of an alternative embodiment.
Figure 7:
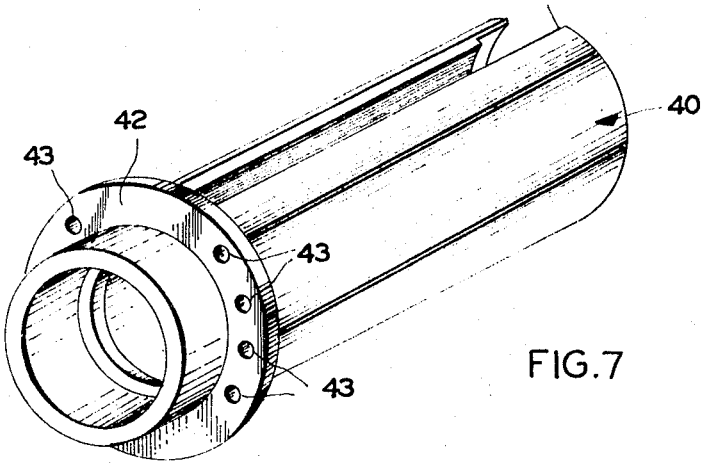
Figure 6:
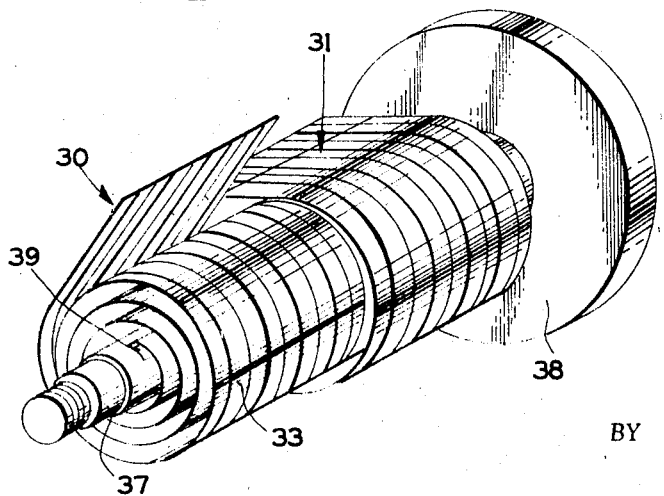

As best shown in FIGS. 5 and 6, an even number of such insulator tapes are provided, each having the same number of conductors. One end of each tape 30 or 31 is attached to a hollow drum 37, passing into a slot 39 formed in the drum 37 leading to its interior. Electrical inlet wires 50 (FIG. 5) passing into the interior of the drum 37 are each electrically joined to a different one of the strip conductors 33, 34, 35 and 36 to provide continuous electrical contact from each inlet wire 50 to a different one of the strip conductors 33, etc.

For minimizing the turning torque, alternate ones of the flexible insulator tapes 30 and 31 are wound counterclockwise and clockwise, as shown in FIG. 6, so that rotation of the drum 37 in either direction serves to coil one tape 30 more tightly while uncoiling the other 31 more loosely.

The flexible insulating tapes 30 and 31 perform the function of supporting the individual conductors and maintaining mechanical spacing and electrical insulation between the conductors.

After the opposite winding of the flexible circuit tapes 30 and 31 about the inner drum 37 in FIG. 6, a hollow sleeve 40 (FIG. 7) is placed over the wound tapes 30 and 31 and concentric about the inner drum 37. Outer sleeve 40 is provided with an elongated slot 41 running lengthwise from one end and leading to a forward projecting ring 42 about the sleeve 40 adapted to receive output terminal wires.

Figure 8:
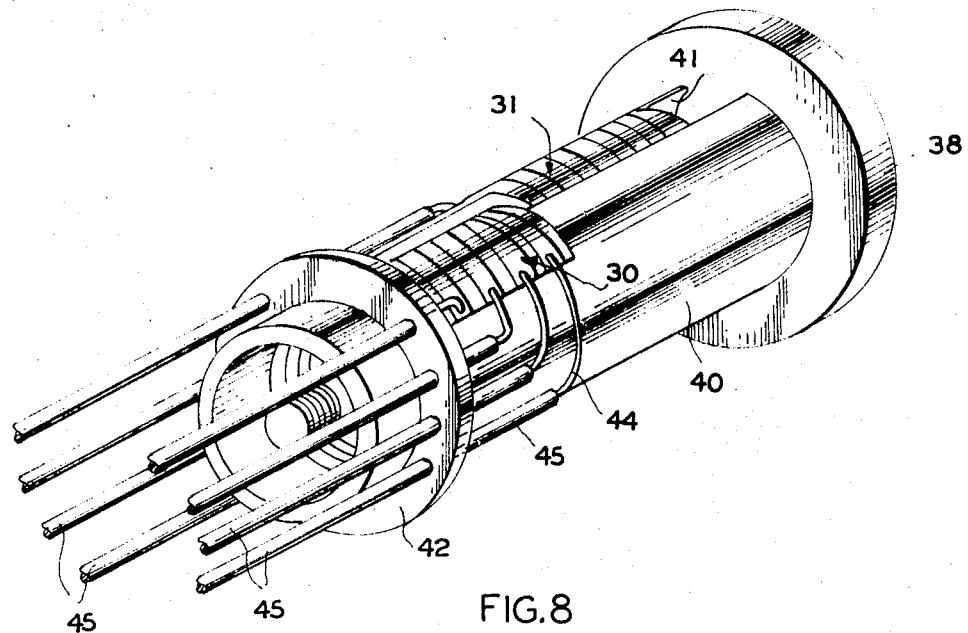

As best shown in FIG. 8, the slotted sleeve 40 completely encloses the spirally wound circuit tapes 30 and 31 except for the outer ends of the conductor carrying tapes that are passed through the slot 41 for electrical connection. The stripped ends 44 of electrical wire conductors 45 are electrically connected to each one of the strip conductors 33, 34, etc. and the insulated portions of such wires 45 are passed through the openings 43 in the forward ring 42 to provide an outlet electrical connection to each of the conductors 34, 35, etc. of the flexible tapes.

Figure 9:
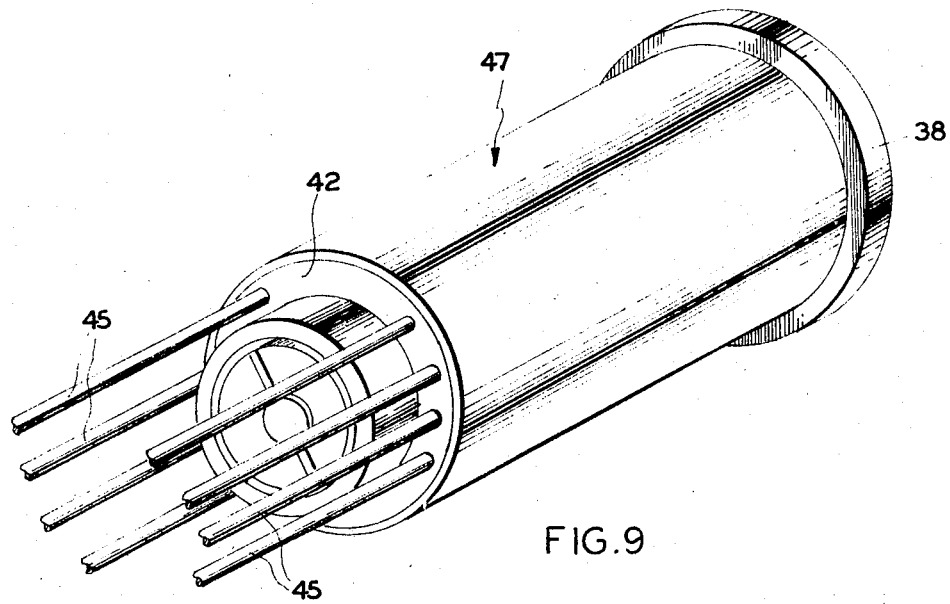

To complete the construction shown in FIG. 9, an unslotted outer hollow sleeve 47 is placed coaxially over the slotted sleeve 40, and having one end near the end flange 38 on the inner drum 37 and the other end thereof extending to and fastened upon the ring 42 that supports the outlet conductors 45. Although not shown, suitable bearings are provided between the inner drum 37 and the slotted sleeve 40 to permit relative rotation between these members. The outer sleeve completely encloses the tapes and wire connections.

Operation of the rotary coupler of FIGS. 5 to 9 is similar to that of FIGS. 1 to 4 previously described in that relative rotation between the inner drum 37 and sleeve 40 (and connected sleeve 47) serves to coil and uncoil the circuit-carrying flexible tapes 30 and 31 thereby providing multicircuit continuous electrical connection between all inlet wires and outlet wires 45 through the coiling and uncoiling of the conductors on the flexible tapes 30 and 31.

Figure 10:
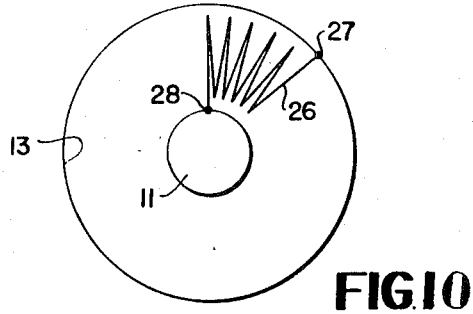
Figure 11:
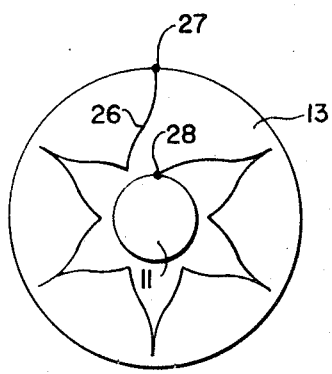

FIGS. 10 and 11 illustrate an alternative manner of providing a relatively displaceable conductor inside and between the inner drum 11 and the outer tube 13. As shown, the conductor 26 inside the coupler parts is provided in the form of an accordion-folded strip member, having one end 28 fastened to the inner drum 11 and the other end 27 fastened to the outer tube 13. Counterclockwise rotation of the outer tube 13 with respect to the drum brings the accordion folds of the conductor 26 more closely together as shown in FIG. 10, whereas clockwise displacement of the outer tube 13 for about one complete revolution opens the folds to almost fully occupy the slot as best shown in FIG. 11. As in the embodiment of FIG. 1, a series of separated conductors 26 may be provided and separated by radial slots formed in walls of the inner drum 11. A series of such conductors are arranged in alternate clockwise and counterclockwise arrangement, as previously described, to minimize torque.

The inner drum 11 may be formed of any suitable dielectric material by any of the processes of turning, casting, molding, stacking of wafers or combination of these techniques.

The enclosed "flexible" conductors, such as 20 in FIG. 1, may be of solid metal strip as shown or may be of stranded wire of circular cross section, multiple stranded wire, shielded cable, insulated wire or other. A single unbroken conductor may be used as shown, or an articulated or otherwise jointed member may be used. Other forms of extendible winding or winding configuration may also be used instead of the coiling as in FIG. 1, the accordion pleating as in FIG. 10 or the strips or printed circuits of FIGS. 5 and 6.

What I claim is:

1. A multiconductor rotary electrical coupler comprising:
a pair of rotatably interconnected members,
a plurality of flexible electrical conductors disposed in axially displaced relationship between said members with each conductor having opposite ends supported with respect to said pair of members each of said flexible electrical conductors having a length greater than the distance between said members and provided with means for maintaining its axial spacing from the other flexible conductors,
an even number of said flexible electrical conductors with one half being supported to provide a turning torque operating in one direction, and with the other half being oppositely connected between said members to provide a turning torque operating in the opposite direction,
plural inlet conductors received by one of said members, with each inlet conductor electrically connected to a different one of said flexible electrical conductors,
plural outlet conductors supported with respect to the other member, and with each electrically connected to a different flexible electrical conductor.

2. In the coupler of claim 1, said flexible electrical conductors comprising a plurality of axially spaced conductive strips in loose spiral configuration about one of said members with one end terminal disposed near the inside of said spiral and the other end terminal near the outside of said spiral.

3. In the coupler of claim 1, one of said members comprising a hollow drum provided with plural radial slots spaced axially along its length, and said other member enclosing said slots, and a flexible electrical conductor disposed in each said slot.

4. In the coupler of claim 3, each of said flexible electrical conductors being in a spiral configuration about the drum and confined within a different slot.

5. In the coupler of claim 3, each of said flexible electrical conductors being disposed in an accordion-pleated configuration and confined within a different slot.

6. In the coupler of claim 1, each of said electrical conductors being disposed in an accordion-pleated expandible configuration between said pair of members.

7. In the coupler of claim 1, one of said members being hollow to receive said plural inlet conductors at its interior with each being electrically interconnected with a different one of said flexible electrical conductors.

8. A rotary electrical coupler comprising:
an inner hollow drum provided with a plurality of radially disposed slots spaced apart axially along its length,
a flexible electrical conductor disposed in spiral configuration provided in each of said slots and having an inner terminal supported on said drum,
an outer hollow tubular member coaxially disposed about said drum and enclosing said slots and conductors and supported in spaced relation therefrom for relative rotation, an outer terminal of each conductor supported by said tubular member at a different axial position from the outer terminals of the other conductors,
equal numbers of said electrical conductors being wound clockwise and counterclockwise to balance turning torques.

9. In the coupler of claim 8, each said flexible conductor comprising an integral strip spirally wound about said drum and having an inner terminal passing through and retained in a slot in said drum leading to the interior thereof for access to a separate inlet electrical conductor, and each flexible conductor having an outer terminal passing through and retained in a slot in the outer hollow tubular member.

10. In the rotary coupler of claim 1, a plurality of said flexible electrical conductors supported in spaced arrangement on a flexible insulating tape.

11. In the coupler of claim 10 at least two of said flexible insulating tapes, each supporting a plurality of said flexible conductors with each said tape supported between said pair of members to oppose the turning torque of the other tape.

12. A multiconductor rotary coupler comprising: a pair of rotatably interconnected coaxially disposed members, at least two elongated flexible insulating tapes in side-by-side spaced relationship between said members and having their opposite ends supported by said members, each tape having a length greater than the radial distance between said pair of members permitting limited rotation between said members, each tape supporting a plurality of spaced apart electrical conductors, said tapes being oppositely connected between said members whereby the turning torques provided by the tapes are in opposition to one another.

13. In the coupler of claim 12, said tapes being disposed in loose spiral configuration between said pair of members, with the spirals in one tape having a clockwise direction and the other tape having its spirals in counterclockwise direction.

14. In the coupler of claim 12, a plurality of inlet conductors received by one of said pair of members, with a different inlet conductor electrically connected to each flexible conductor, and plural outlet conductors provided on the other member and with each electrically connected to a different flexible conductor.